United States Patent [19]
Osada

[11] Patent Number: 5,335,218
[45] Date of Patent: Aug. 2, 1994

[54] DISC LOADING TRANSFER MECHANISM FOR PLURAL DISC CHANGER

[75] Inventor: Yasuo Osada, Saitama, Japan

[73] Assignee: Sony Corporation, Japan

[21] Appl. No.: 873,102

[22] Filed: Apr. 24, 1992

[30] Foreign Application Priority Data

| May 2, 1991 | [JP] | Japan | 3-100806 |
| May 2, 1991 | [JP] | Japan | 3-100807 |
| Jul. 17, 1991 | [JP] | Japan | 3-176325 |
| Jul. 17, 1991 | [JP] | Japan | 3-176326 |

[51] Int. Cl.$^5$ .................. G11B 17/22; G11B 17/18
[52] U.S. Cl. ................... 369/178; 369/192; 369/36; 360/98.04
[58] Field of Search .......... 360/98.04, 98.06; 369/36, 178, 191–192

[56] References Cited

U.S. PATENT DOCUMENTS

| 2,935,325 | 5/1960 | Durant | 369/192 |
| 3,293,414 | 12/1966 | Barcia | 235/61.11 |
| 4,589,101 | 5/1986 | Schatteman et al. | 369/36 |
| 4,633,452 | 12/1986 | Shimbo et al. | 369/39 |
| 4,695,990 | 9/1987 | Kawakami | 369/36 |
| 4,701,900 | 10/1987 | Hasegawa et al. | 369/36 |
| 5,136,562 | 8/1992 | Staar | 360/98.04 |
| 5,163,040 | 11/1992 | Hake | 369/178 |
| 5,218,583 | 6/1993 | Miyajima | 360/98.04 |

FOREIGN PATENT DOCUMENTS

| 3421912 | 1/1985 | Belgium . |
| 0151807 | 8/1985 | European Pat. Off. . |
| 0456464 | 11/1991 | European Pat. Off. ............ 369/191 |
| 898775 | 5/1984 | Fed. Rep. of Germany . |
| 6015854 | 1/1985 | Japan . |
| 6098563 | 6/1985 | Japan . |

*Primary Examiner*—A. J. Heinz
*Assistant Examiner*—Brian E. Miller
*Attorney, Agent, or Firm*—Ronald P. Kananen

[57] ABSTRACT

A disc loading apparatus for delivery of a disc between a disc container and a disc carrier. The disc loading apparatus comprises a drive roller mounted rotatably on the disc carrier. The drive roller has a peripheral surface for contact with the peripheral surface of the disc. The disc carrier has a semicircular guide member secured thereon at a position concentric with the drive roller to define a disc delivery path along with the drive roller. The semicircular guide member has an inner peripheral surface facing to the peripheral surface of the drive roller for contact with the peripheral surface of the disc. The disc carrier also has a disc knocker mechanism provided thereon for knocking the peripheral surface of the disc to push the disc out of the disc container into the disc delivery path. The drive roller is rotated to advance the disc in the disc delivery path with the disc revolving around the drive roller.

16 Claims, 14 Drawing Sheets

DISC LOADING TRANSFER MECHANISM FOR PLURAL DISC CHANGER

BACKGROUND OF THE INVENTION

This invention relates to a disc loading apparatus for delivery of a disc between a disc container and a disc carrier.

Disc loading apparatus have been proposed for automatic and continuous recording or reproducing operations for a number of discs. Such a conventional disc loading apparatus employs a tray pulling mechanism and a disc clamping mechanism. The tray pulling mechanism is used to pull a disc tray on which a desired disc is placed out of the disc receiver. The disc clamping mechanism is used to transfer the disc from the disc tray onto a disc carrier. The disc carrier moves to deliver the disc to the disc drive. A number of the disc trays are required to place a number of discs in the disc container. Thus, the conventional disc loading apparatus requires a complex, expensive and space consuming disc container.

SUMMARY OF THE INVENTION

Therefore, it is a main object of the invention to provide a simple and inexpensive disc loading apparatus which can assure easy and certain delivery of discs between a disc container and a disc carrier.

There is provided, in accordance with the invention, a disc loading apparatus for delivery of a disc between a disc container and a disc carrier. The apparatus comprises a drive roller mounted rotatably on the disc carrier. The drive roller has a peripheral surface for contact with the peripheral surface of the disc. A semicircular guide member is secured on the disc carrier at a position concentric with the drive roller to define a disc delivery path along with the drive roller. The semicircular guide member has an inner peripheral surface facing to the peripheral surface of the drive roller for contact with the peripheral surface of the disc. A disc knocker mechanism is provided on the disc carrier for knocking the peripheral surface of the disc to push the disc out of the disc container into the disc delivery path. The disc loading apparatus also includes drive means for rotating the drive roller to advance the disc in the disc delivery path with the disc revolving around the drive roller.

In another aspect of the invention, there is provided a disc loading apparatus including a disc container having a plurality of discs placed in a pile therein, a disc drive for recording and/or reproducing data for a disc, and a disc carrier for movement between the disc container and the disc drive for carrying a desired one of the discs. The disc carrier comprises an electric motor, a wheel, a knock lever secured rotatably on the disc carrier for pushing a desired one of the discs out of the disc container with rotation of the wheel, and a clutch movable between first and second positions. The clutch transmits a drive from the electric motor to rotate the wheel at the first position. The clutch interrupts the drive to the wheel at the second position. The disc carrier also comprises release means provided on the knock lever for moving the clutch to the second position after the desired one disc is pushed out of the disc container.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
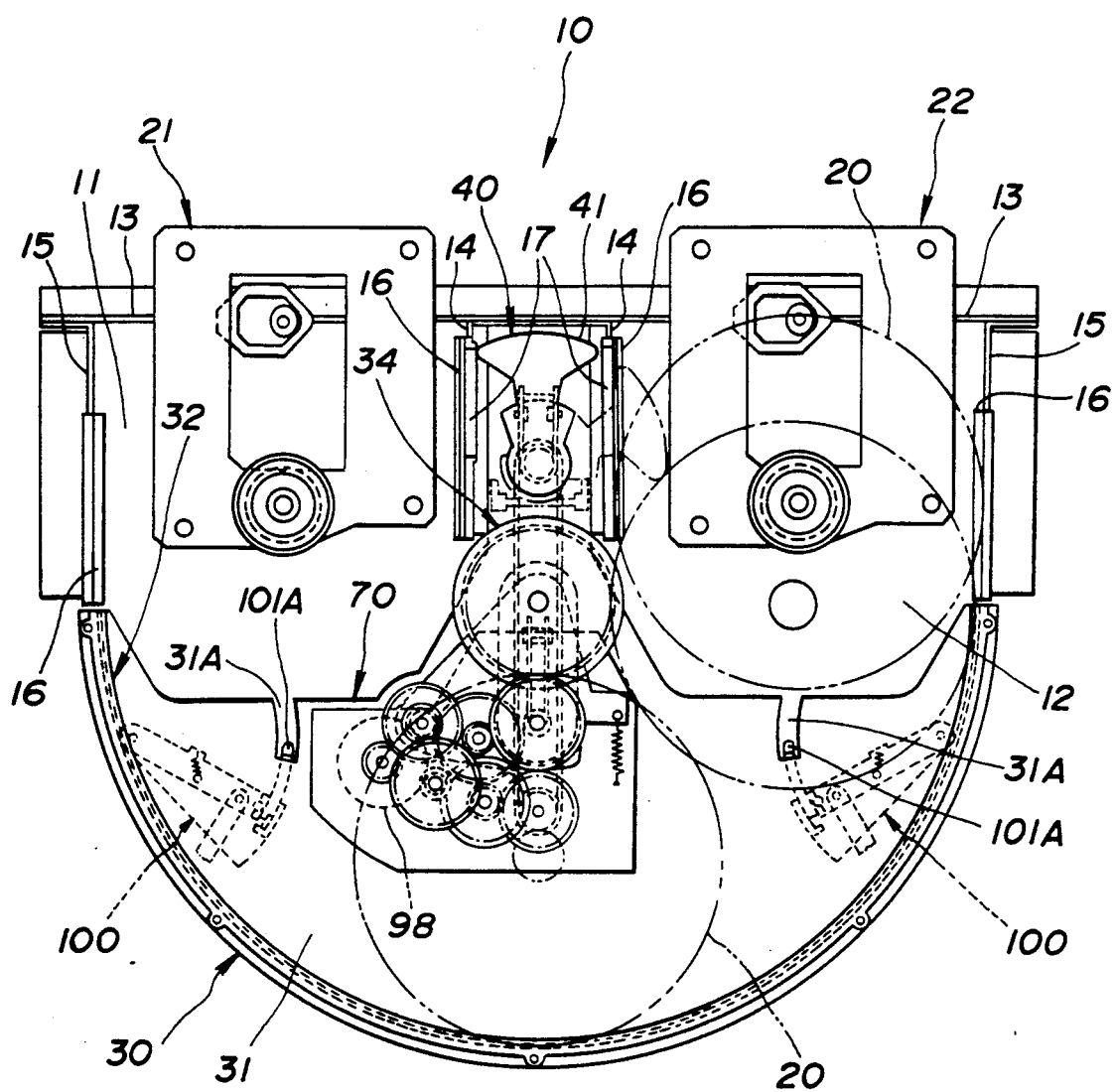
FIG. 1 is a plan view showing one embodiment of a disc loading apparatus made in accordance with the invention.
Figure 2:
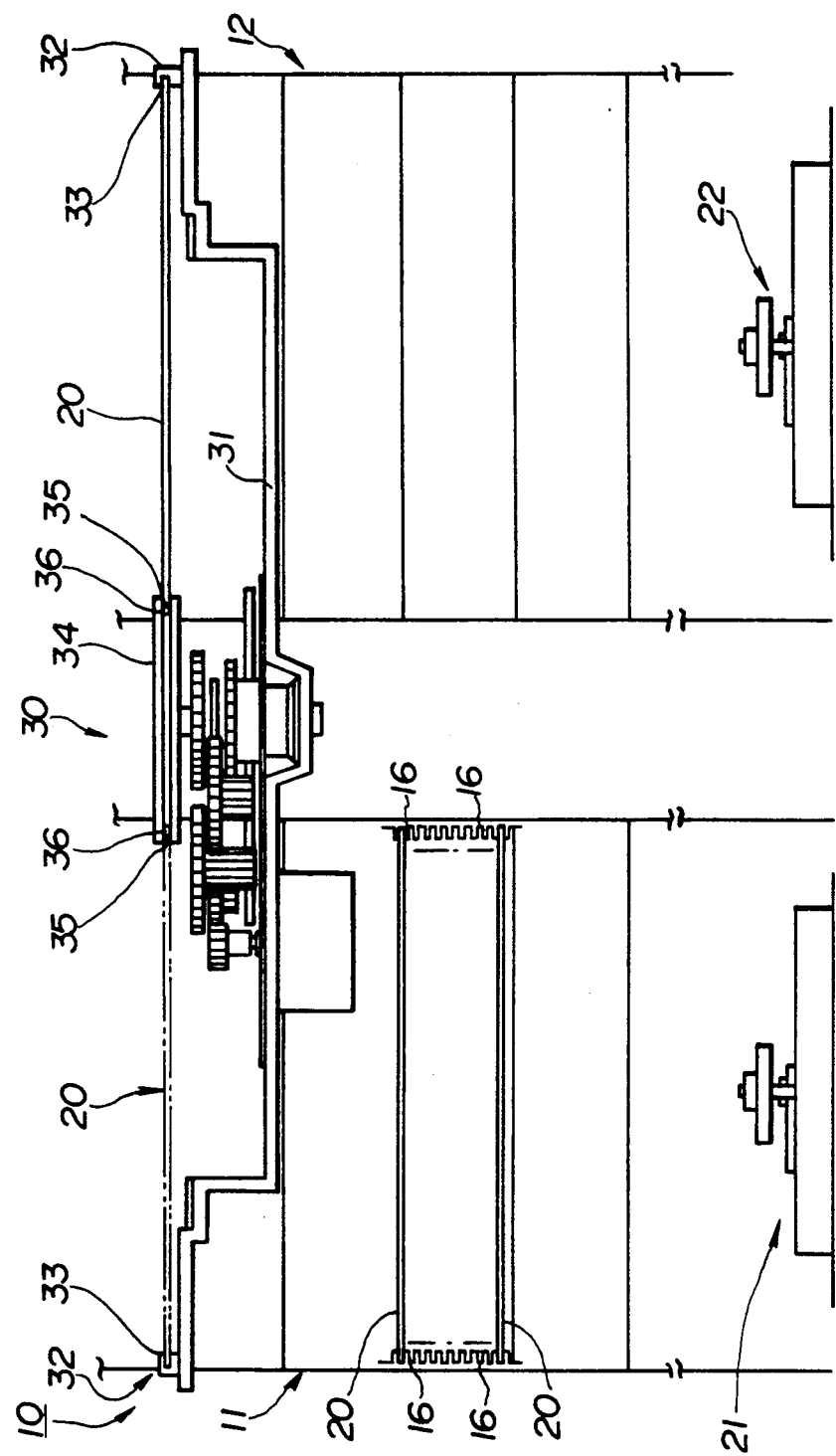
FIG. 2 is an elevational view of the disc loading apparatus of FIG. 1.

With reference to the drawings, wherein like numerals refer Go like parts in the several views, and in particular to FIGS. 1 and 2, there is shown a disc loading apparatus embodying the invention. The disc loading apparatus, generally designated by the numeral 10, is supported for upward and downward movement with respect to a disc receiver having left and right disc containers 11 and 12 spaced away from each other. Each of the disc containers 11 and 12 has a rear panel 13, and inner and outer side panels 14 and 15 opposite to each other. The inner and outer side panels 14 and 15 have a number of frames 16 secured on the inner surface thereof, the frames 16 extending in spaced-parallel relation with each other to form horizontal disc racks arranged in a vertical direction. A recording disc 20 is received in one of the disc racks each of which is defined by the rear panel 13, the inner and outer side panels 14 and 15, two adjacent frames 16 provided on the inner side panel 14, and two adjacent frames 16 provided on the outer side panel 15. Each disc rack has an opening 17 formed through the inner side panel 14. Left and right disc drives 21 and 22 are shown as placed below the left and right disc containers 11 and 12, respectively. It is to be understood, of course, that the left and right disc drives 21 and 22 may be positioned above the left and right disc containers 11 and 12, respectively.

The disc loading apparatus 10 has a disc carrier 30 for delivery of a disc 20 from a disc rack to one of the disc drives 21 and 22 and also for delivery of the disc 20 from the one disc drive to the disc rack. The disc carrier 30 includes a chassis 31 supported for upward and downward movement along the front of the disc receiver. The chassis 31 has a semicircular disc guide member 32 secured thereon. The disc guide member 32 is formed in its inner surface with a semicircular groove 33 for engagement with the periphery of a disc 20. A drive roller 34 is rotatably mounted on the chassis 31 at a position concentric with the semicircular disc guide member 32. The drive roller 34 is formed on its peripheral surface with an annular groove 35 for engagement with the periphery of a disc 20. The annular groove 35 defines a semicircular disc delivery path together with the semicircular groove 33 of the disc guide member 32. A disc 20, placed in this disc delivery path, engages on its one side with the annular groove 35 and on the other side thereof with the semicircular groove 33. With rotation of the drive roller 34, the disc 20 advances in the disc delivery path while revolving around the drive roller 34 like a planetary gear. A friction member 36, such as a rubber member, is provided on the bottom of the annular groove 35 to ensure certain transmission of rotation of the drive roller 34 to the disc 20. The disc loading apparatus also includes a disc knocker mechanism 40 for discharging a disc from the disc rack into the disc delivery path and a disc return mechanism 100 for discharging the disc from the disc delivery path into the disc rack.

Figure 3:
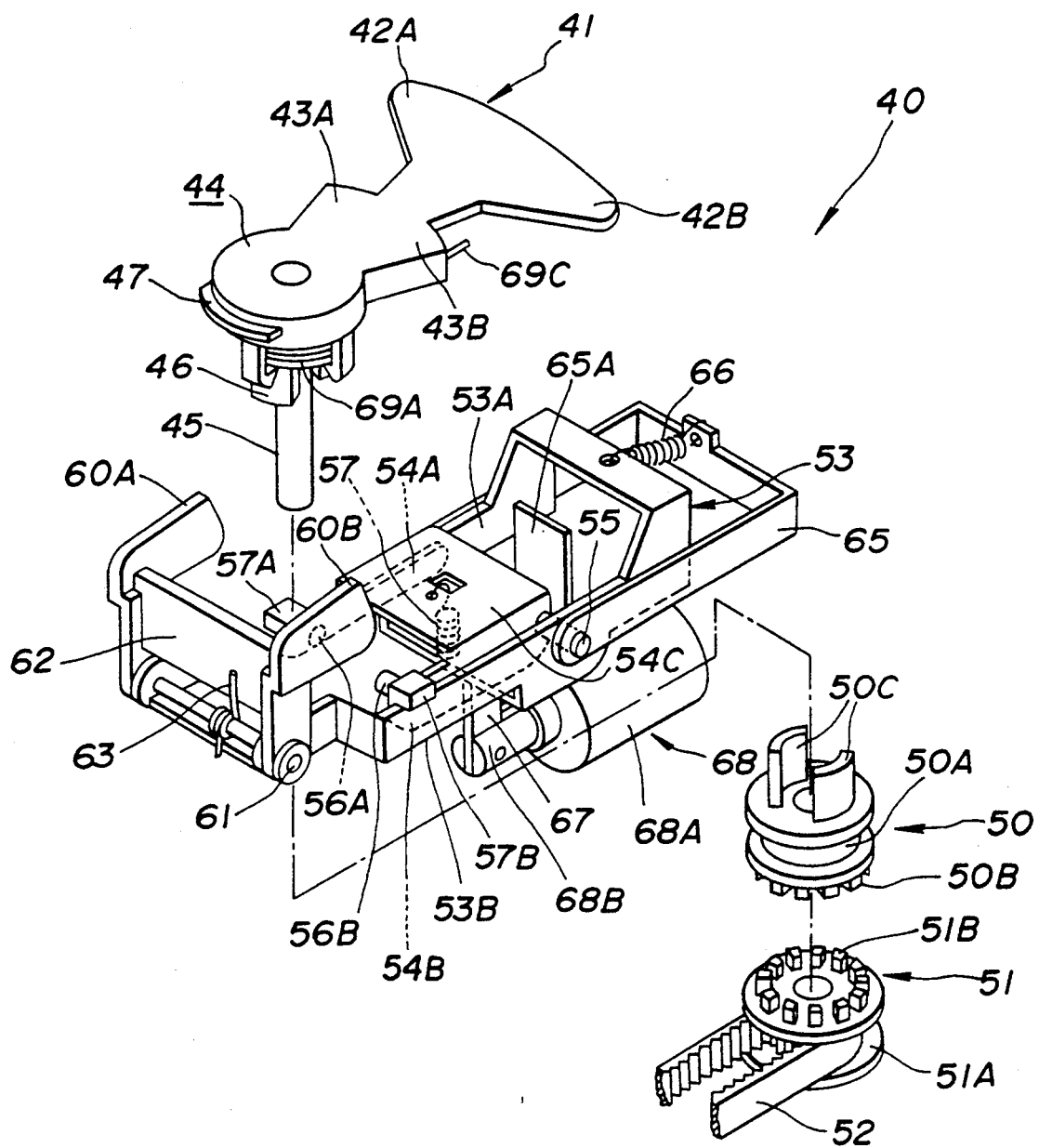
FIG. 3 is an exploded perspective view showing a disc knocker mechanism used in the disc loading apparatus of FIG. 1.

Referring to FIG. 3, the disc knocker mechanism 40 includes a hammer-shaped knock lever 41 having head side portions 42A and 42B, shoulder portions 43A and 43B, and a root portion 44 secured on a shaft 45. The root portion 44 has tongues 46 extending downward therefrom and a stopper 47 extending forward therefrom. The shaft 45 extends centrally through a cylindrical clutch member 50 and a cylindrical drive wheel 51. The clutch member 50 is formed in its peripheral surface with an annular groove 50A and on its lower surface with a number of teeth 50B equally spaced circumferentially. The clutch member 50 also has projections 50C extending upward from the upper surface thereof for engagement with the tongues 46 of the knock lever 41. The drive wheel 51 is formed in its peripheral surface with an annular threaded groove 51A and on its upper surface with a number of teeth 51B equally spaced circumferentially for engagement with the teeth 50B of the clutch member 50. A timing belt 52 is journalled on the annular threaded groove 51A of the drive wheel 51. At a position where the teeth 50B are held in mesh engagement with the teeth 51B, the clutch member 50 transmits a drive from the drive wheel 51 to rotate the knock lever 41 so as to push a disc 20 from the disc rack into the disc delivery path. When the clutch member 50 moves upward, the engagement of the teeth 50B with the teeth 51B is released. The clutch member 50 is moved toward and away from the drive wheel 51 by means of a clutch control mechanism.

The clutch control mechanism includes a rotary frame 53 having two arm portions 53A and 53B connected to each other by a cross plate 53C. First and second inner arms 54A and 54B are connected to each other by a cross plate 54C. A coil spring 57 is placed between the cross plates 53C and 54C. The first inner arm 54A is secured rotatably near its front end through a shaft 55 on the arm portion 53A of the rotary frame 53. The first inner arm 54A is provided near its rear end with a pin 56A formed on its inner surface and with a stopper 57A formed on its outer surface. The pin 56A extends into the annular groove 50A of the clutch member 50. The first inner arm 54A is urged, under the resilient force of the coil spring 57, in a direction bringing the stopper 57A into pressure contact with the upper surface of the arm portion 53A of the rotary frame 53. Similarly, the second inner arm 54B is secured rotatably near its front end through the shaft 55 on the arm portion 53B of the rotary frame 53. The second inner arm 54B is provided near its rear end with a pin 56B formed on its inner surface and with a stopper 57B formed on its outer surface. The pin 56B extends into the annular groove 50A of the clutch member 50. The second inner arm 54B is urged, under the resilient force of the coil spring 57, in a direction bringing the stopper 57B into pressure contact with the upper surface of the arm portion 53B of the rotary frame 53.

Left and right levers 60A and 60B are secured rotatably through a pivot shaft 61 to the ends of the respective arm portions 53A and 53B of the rotary frame 53. A lock plate 62 extends between the left and right levers 60A and 60B. A coil spring 63 encircles the shaft 61 and urges the lock plate 62 toward the knock lever 41 into engagement with the stopper 47 formed on the front end of the knock lever 41. The numeral 65 designates a support frame fixed on the chassis 31. The support frame 65 has two arm portions secured rotatably through the shaft 55 to the respective arm portions 53A and 53B of the rotary frame 53. A coil spring 66 is placed between the rotary frame 53 and the support frame 65 to urge the rotary frame 53 in a direction causing the clutch member 50 to move upward away from the drive wheel 51. A connection plate 67, which is secured at its one end to the arm portion 53B, extends substantially at right angles from the arm portion 53B. A solenoid actuator 68 has a solenoid 68A fixed on the chassis 31 and a plunger 68B movable by the solenoid 68A. The plunger 68B is pinned at its free end to the other end of the connection plate 67. A toggle spring 69 encircles the shaft 45 and holds the knock lever 41 in its equilibrium position. The toggle spring 69 has a coiled portion 69A wound around the shaft 45 and parallel arm portions 69B and 69C held in contact with the opposite sides of a plate 65A fixed on the support frame 65. The toggle spring 69 provides a resilient force to return the knock lever 41 to the equilibrium position when the knock lever 41 rotates in either direction.

Figure 4:
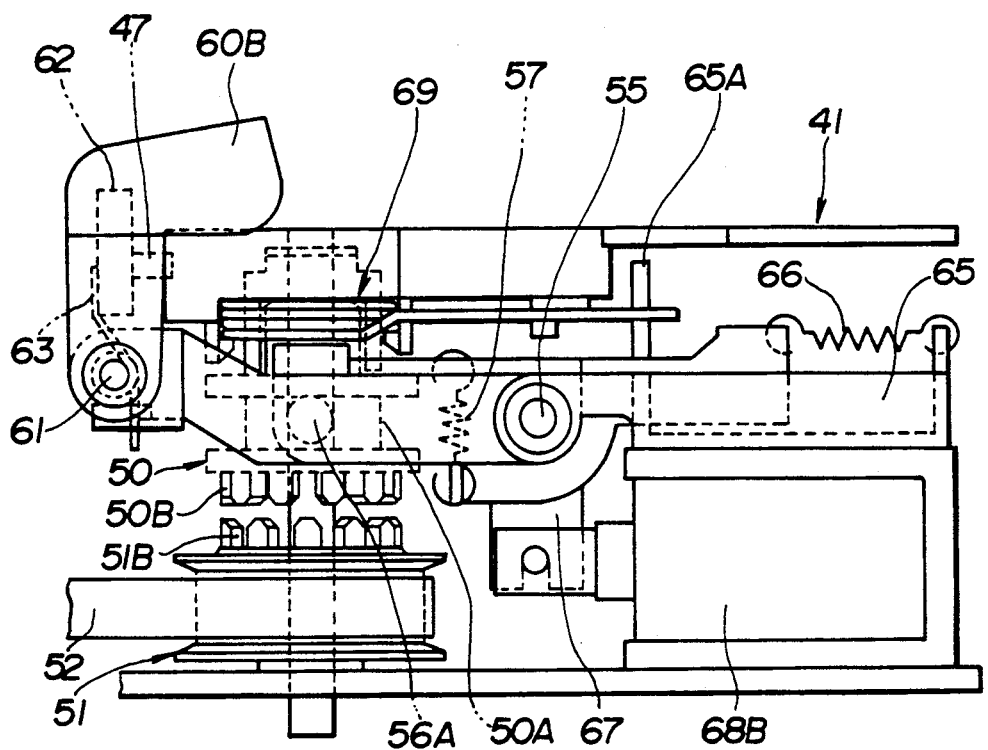
FIG. 4 is a side view showing the disc knocker mechanism with the knock lever in the equilibrium position.
Figure 5:
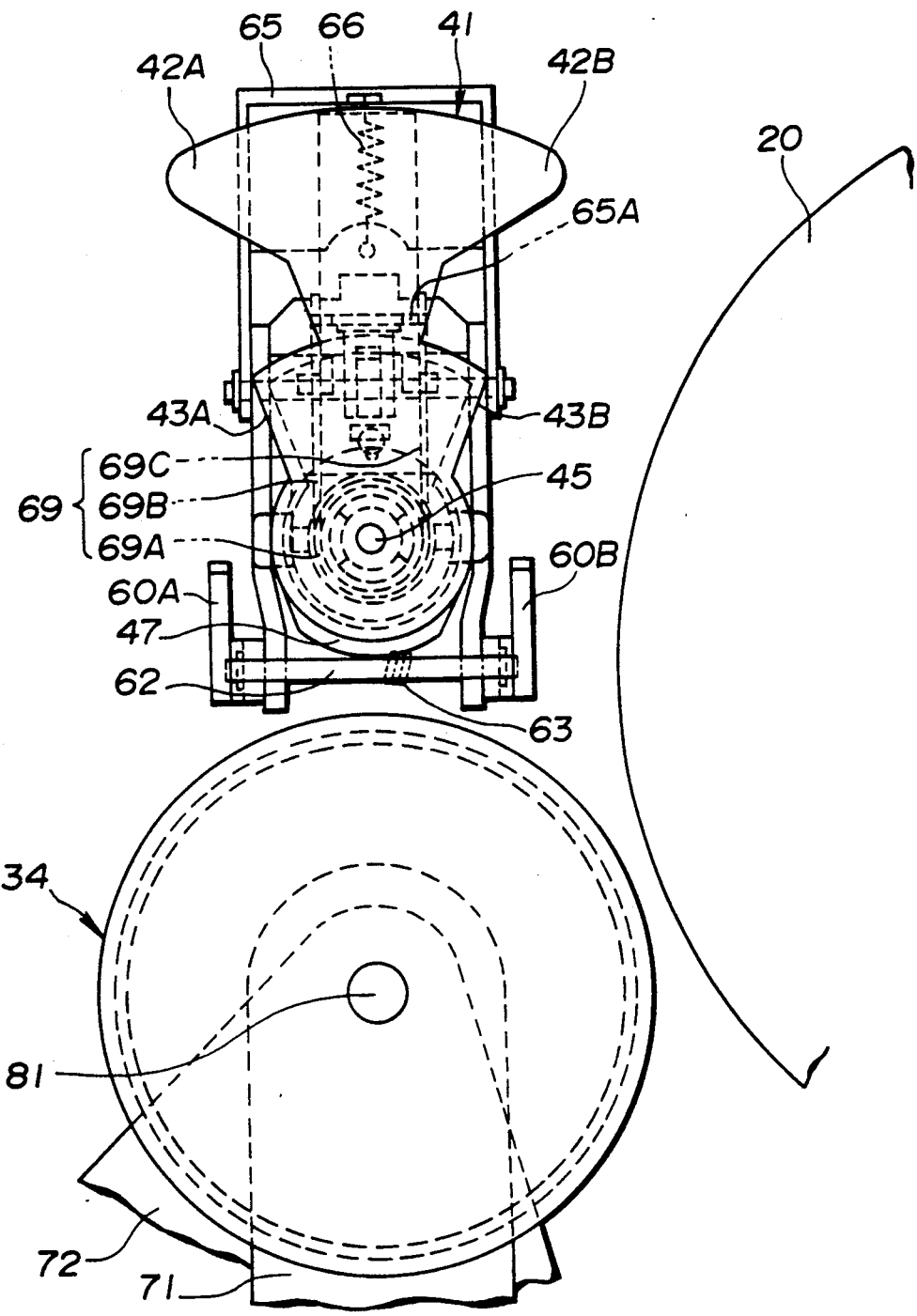
FIG. 5 is a plan view showing the disc knocker mechanism with the knock lever in the equilibrium position.

When the solenoid 68A is deenergized to hold the plunger 68B in its extruded position, as shown in FIG. 4, the clutch member 50 is separated from the drive wheel 51. As a result, no drive is transmitted to the knock lever 41. Consequently, the knock lever 41 is in its equilibrium position, as shown in FIG. 5, under the resilient force of the toggle spring 69. As best shown in FIG. 4, the inclined stopper 47 engages with the rear surface of the lock plate 62 to allow rotation of the rotary frame 53.

Figure 6:
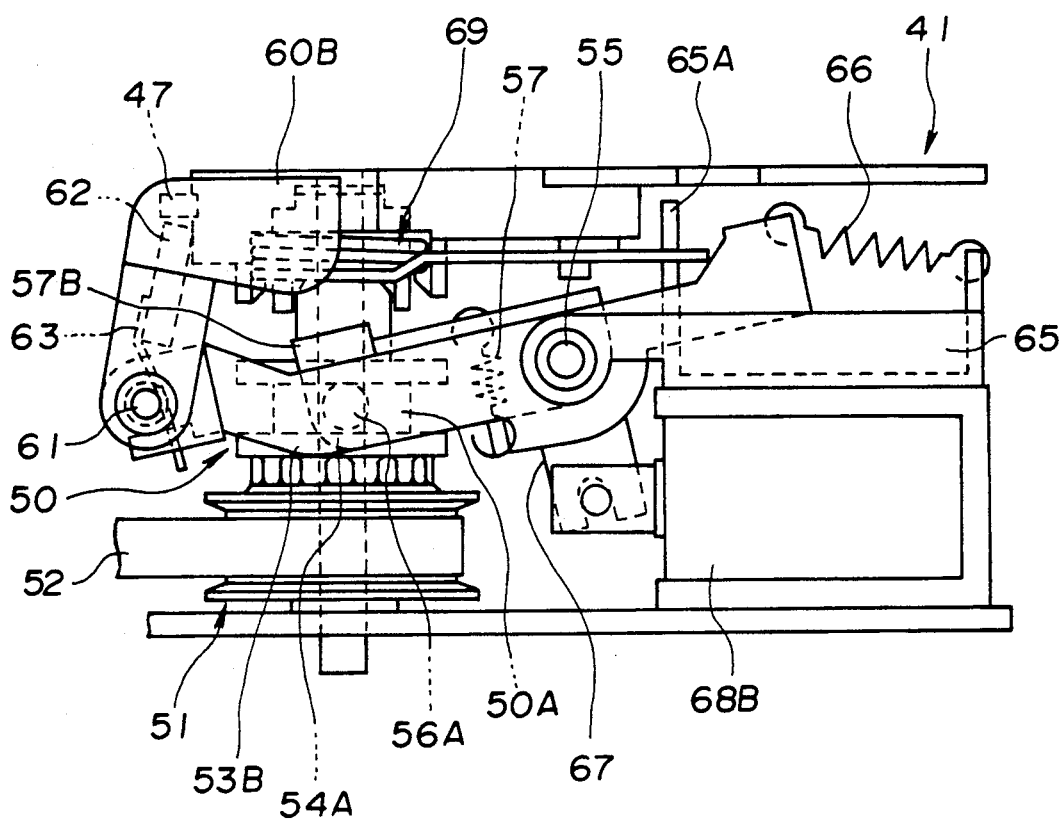
FIG. 6 is a side view showing the disc knocker mechanism with the knock lever rotated at a first predetermined angle.
Figure 7:
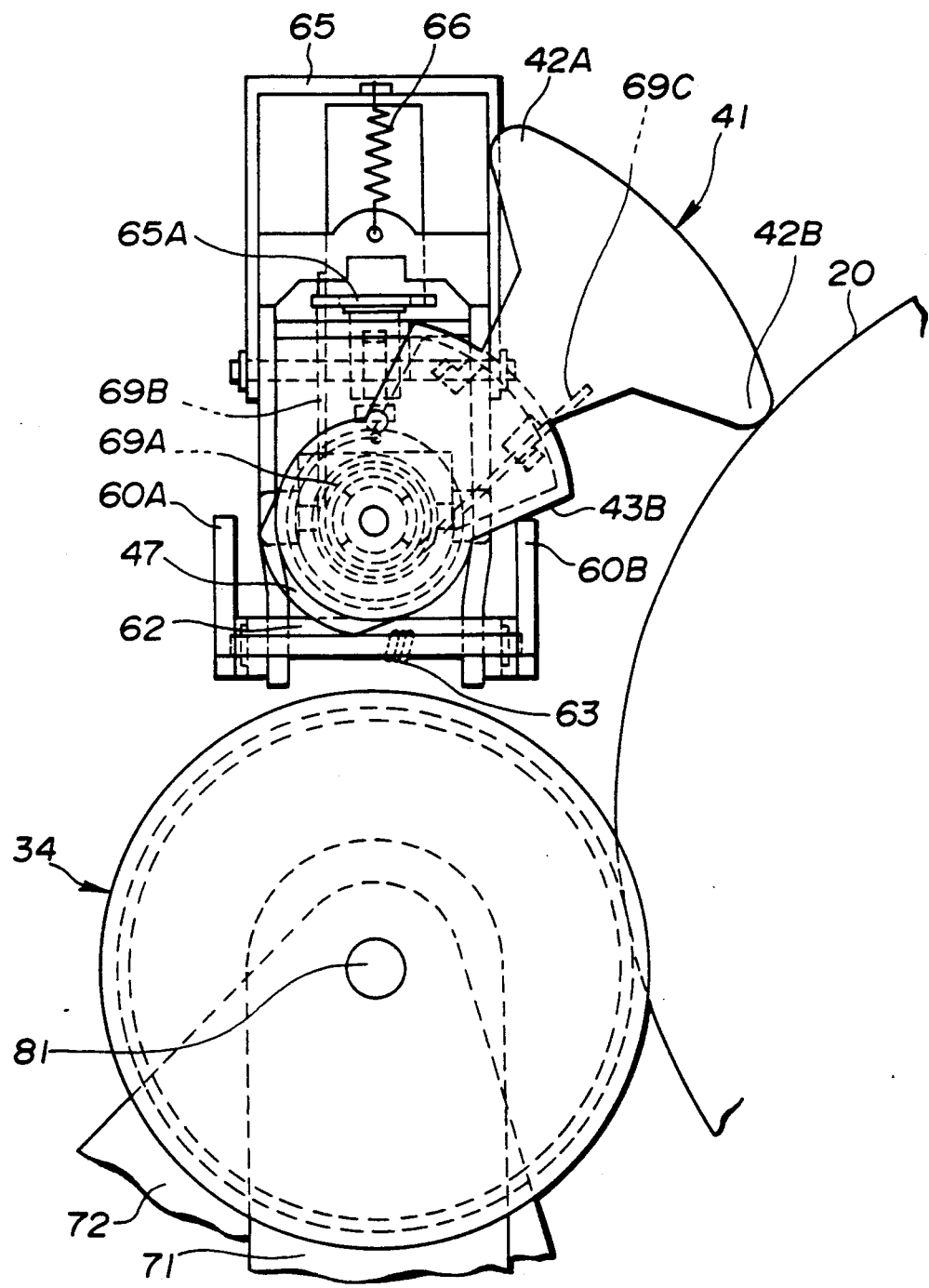
FIG. 7 is a plan view showing the disc knocker mechanism with the knock lever rotated at the first predetermined angle.

When the solenoid 68A is energized to pull the plunger 68B, the rotary arm 53 rotates about the shaft 55 against the resilient force of the coil spring 66. The first and second inner arms 53A and 53B rotate in unison with the arm portions 54A and 54B under the resilient force of the coil spring 57, causing the pins 56A and 56B to move the clutch member 50 downward into engagement with the drive wheel 51. With rotation of the rotary frame 53, the left and right levers 60A and 60B rotates to bring the lock plate 62 out of engagement with the stopper 47. At the same time when the lock plate 62 is disengaged, the lock plate 62 rotates about the shaft 61, under the resilient force of the coil spring 63, to bring its upper end into engagement with the stopper 47 so as to place the rotary frame 53 in a locked condition where the rotary frame 53 is prevented from rotating in the clockwise direction, as viewed in FIG. 6. This engagement serves to retain the engagement of the clutch member 50 with the drive wheel 51. As a result, a drive is transmitted to rotate the hock lever 41 against the resilient force of the toggle spring 69 in the clockwise direction, as viewed in FIG. 7. The knock lever 41 enter the disc rack through the opening 17 to push a disc 20 out of the disc rack into the disc delivery path. When the rotary frame 53 rotates at a predetermined angle, its right shoulder portion 43B comes into abutment against the right lever 60B, as shown in FIG. 7.

Figure 8:
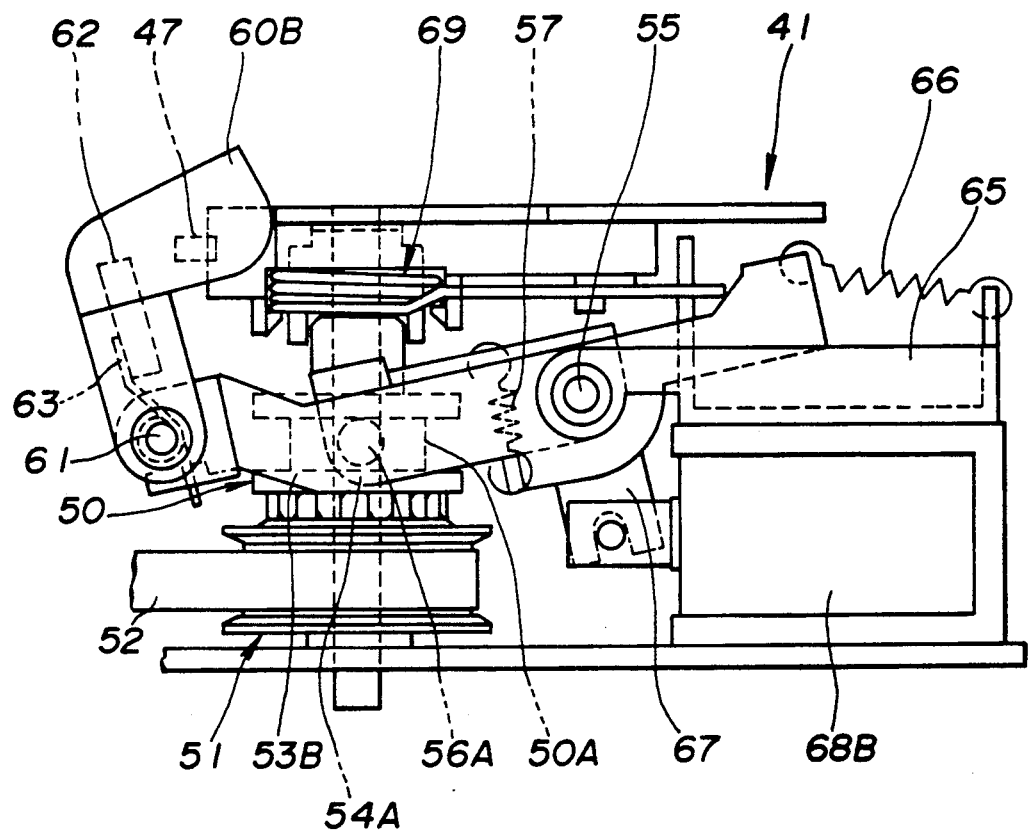
FIG. 8 is a side view showing the disc knocker mechanism with the knock lever rotated at a second predetermined angle greater than the first predetermined angle.
Figure 9:
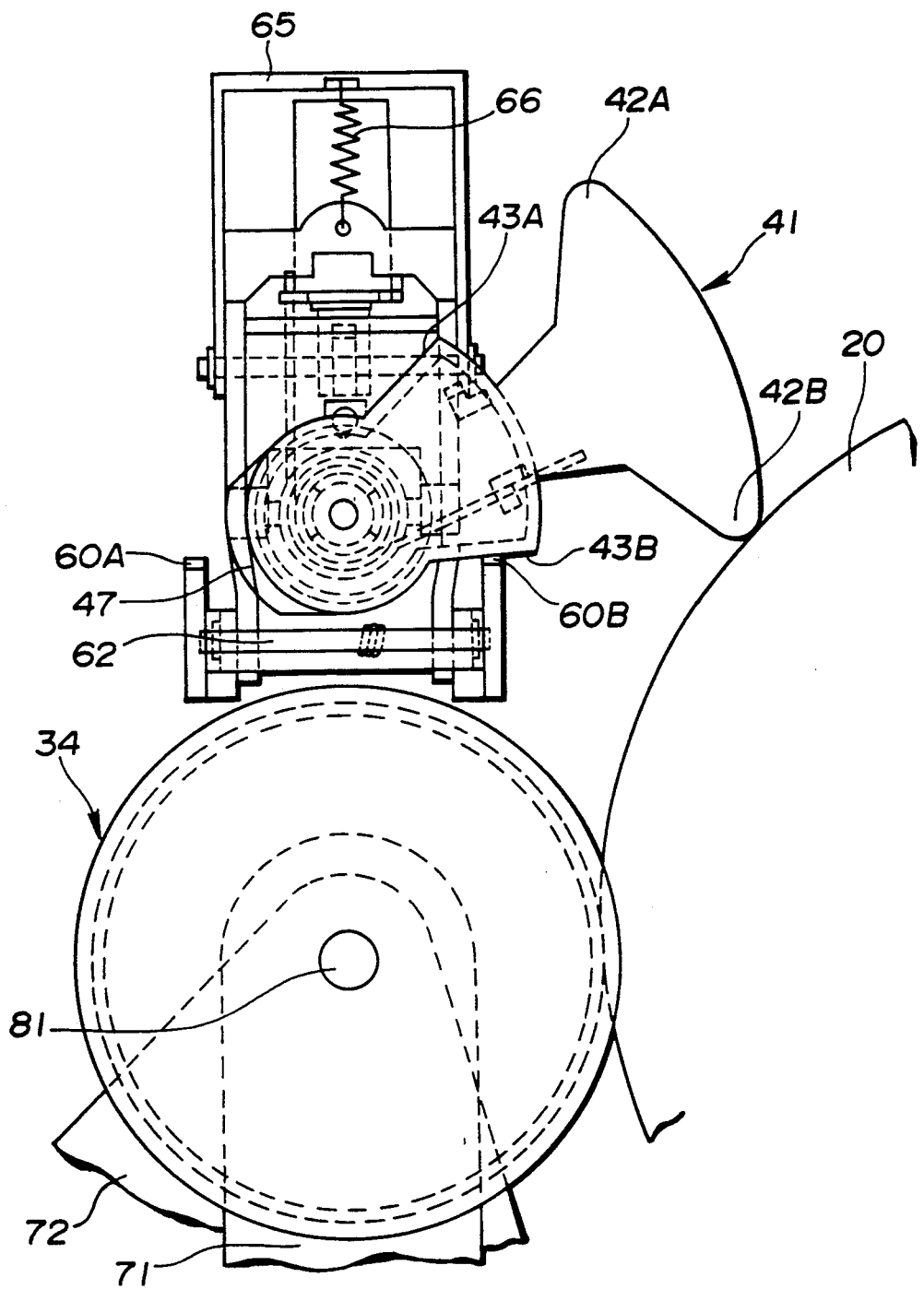
FIG. 9 is a plan view showing the disc knocker mechanism with the knock lever rotated at the second predetermined angle.

When the knock lever 41 rotates further, as shown in FIG. 9, the right shoulder portion 43B pushes the right lever 60B against the resilient force of the coil spring 63 to bring the lock plate 62 out of engagement with the stopper 47, as shown in FIG. 8, so as to release the locked condition of the rotary frame 53. As a result, the rotary frame 53 rotates in the clockwise direction, as viewed in FIG. 8, under the resilient force of the coil spring 66 to move the clutch member 50 away from the drive wheel 51 so as to interrupt the drive to the knock lever 41. Consequently, the knock lever 41 returns to its equilibrium position under the resilient force of the toggle spring 69.

When the knock lever 41 is rotated in the reverse (counter-clockwise) direction, the disc knocker mechanism 40 operates to push a disc from a disc rank included in the left disc container 11 into the disc delivery path in the same manner as described above in connection with the right disc container 12.

Figure 10:
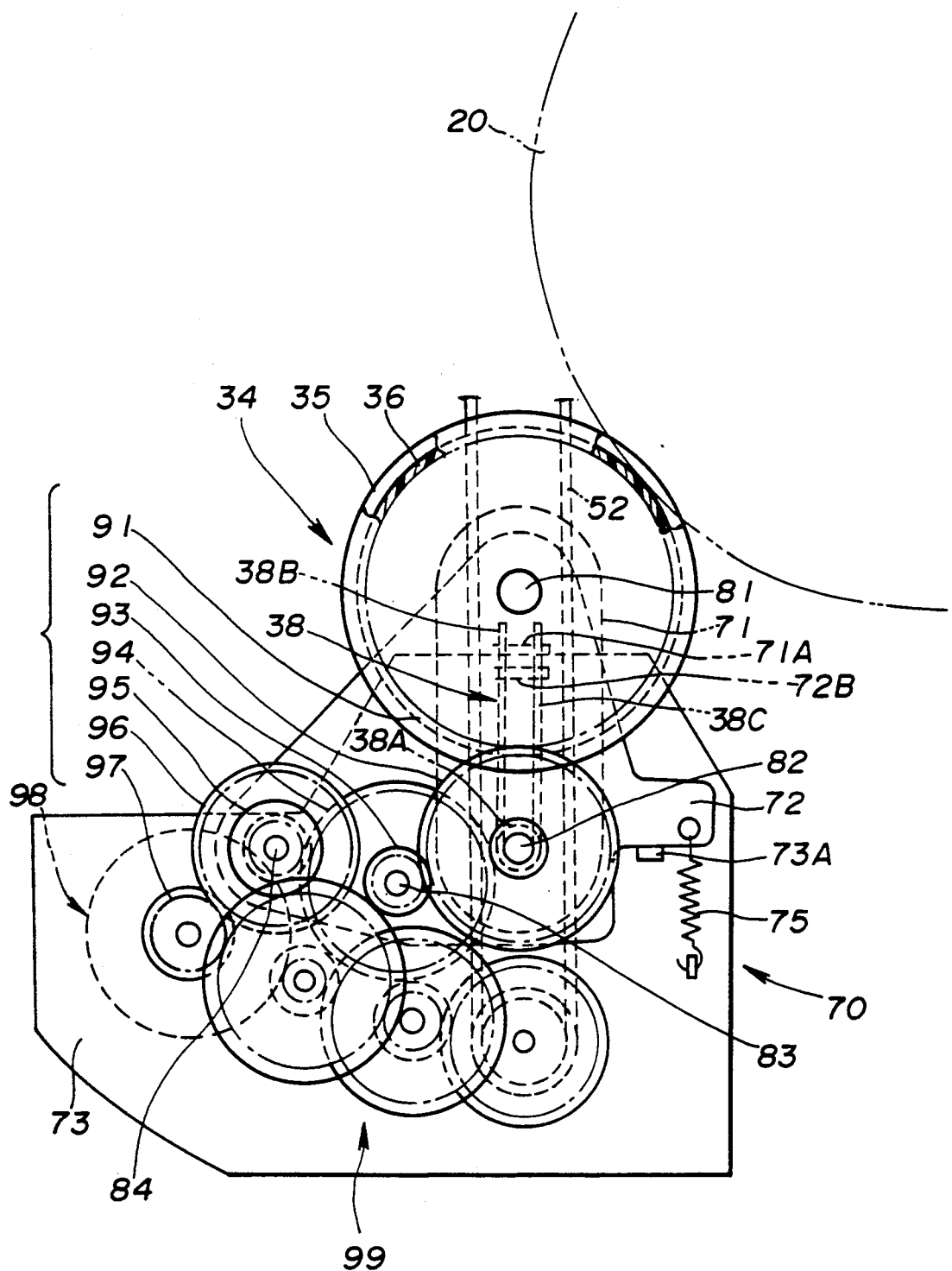
FIG. 10 is a plan view showing the drive mechanism used in the disc loading apparatus of FIG. 1.
Figure 11:
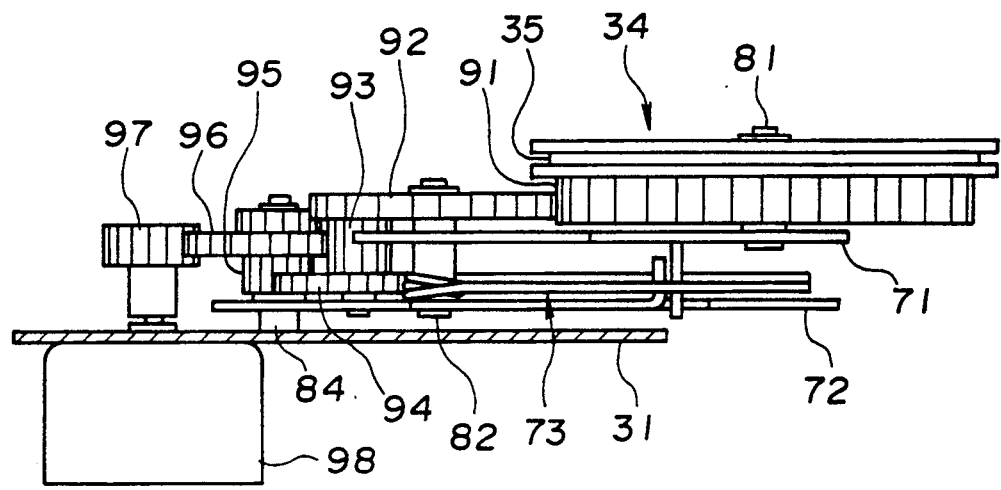
FIG. 11 is a side view showing the drive mechanism of FIG. 10.

Referring to FIGS. 10 and 11, there is shown a drive mechanism suitable for use in the disc loading apparatus of the invention. The drive mechanism, generally designated by the numeral 70, includes a first rotary member 71 having a first shaft 81 secured at its one end thereof. The drive roller 34 is journalled rotatably on the first shaft 81. A first gear 91 is journalled on the first shaft 81 for rotation in unison with the drive roller 34. The other end of the first rotary member 71 is secured rotatably through a second shaft 82 on a second rotary member 72. The first gear 91 is held in mesh engagement with a second gear 92 secured rotatably on the second shaft 82. The second gear 92 is held in mesh engagement with a third gear 93 secured rotatably on a third shaft 83 secured on the second rotary disc 72. The third shaft 83 has a fourth gear 94 secured thereon for rotation in unison with the third gear 93. The fourth gear 94 is held in mesh engagement with a fifth gear 95 secured rotatably on a fourth shaft 84 through which the second rotary member 72 is mounted rotatably on a support member 73 fixed on the base member 31. The fourth shaft 84 has a sixth gear 96 secured thereon for rotation in unison with the fifth gear 95. The sixth gear 96 is held in mesh engagement with a seventh gear 97 secured fixedly on the output shaft of an electric motor 98 fixed on the base member 31. The drive from the electric motor 98 is also transmitted through a gear train 99 to a roller 99A on which the timing belt 52 is journalled to rotate the drive wheel 51 (FIG. 3).

The support member 73 has a stopper 73A fixed thereon. A coil spring 75 is provided between the members 72 and 73 and it urges the second member 72 into engagement with the stopper 73A so as to retain the drive roller 34 at its equilibrium position. This structure permits the drive roller 34 to escape with the drive maintained from the electric motor 98 to the drive roller 34 when a disc 20 enters the disc delivery path and pushes the drive roller 34. That is, the drive roller 34 can rotate about the fourth shaft 84 in the counter-clockwise direction, as viewed in FIG. 10, against the resilient force of the coil spring 75. This is effective to assure easy and certain engagement of the disc 20 with the annular groove 35 of the drive roller 34 and also with the semicircular groove 33 of the disc guide member 32 when the disc 20 enters the disc delivery path and pushes the drive roller 34. The coil spring 75 also provides a resilient force causing the drive roller 34 to push the disc 20 against the guide member 32 when the disc 20 is positioned intermediate between the ends of the disc delivery path, as best shown in FIG. 1.

Figure 12:
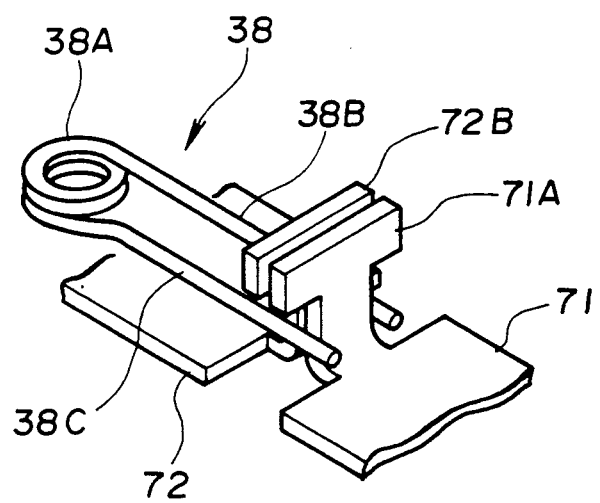
FIG. 12 is an enlarged perspective view showing a toggle spring used in the disc loading apparatus of FIG. 1.

A toggle spring 38 encircles the second shaft 82 and holds the drive wheel 34 in its equilibrium position. The toggle spring 38 has a coiled portion 38A wound around the second shaft 82 and parallel arm portions 38B and 38C. As best shown in FIG. 12, the arm portions 38B and 38C are held in contact with the opposite sides of a projection 71A formed on the first rotary member 71 and also with the opposite sides of a projection 72A formed on the rotary member 72. The toggle spring 38 provides a resilient force to return the drive roller 34 to the equilibrium position when the first rotary member 71 rotates in either direction. The toggle spring 38 also provides a resilient force causing the drive roller 34 to push the disc 20 against the disc guide member 32 until the disc arrives at the position intermediate between the ends of the disc delivery path.

Figure 13:
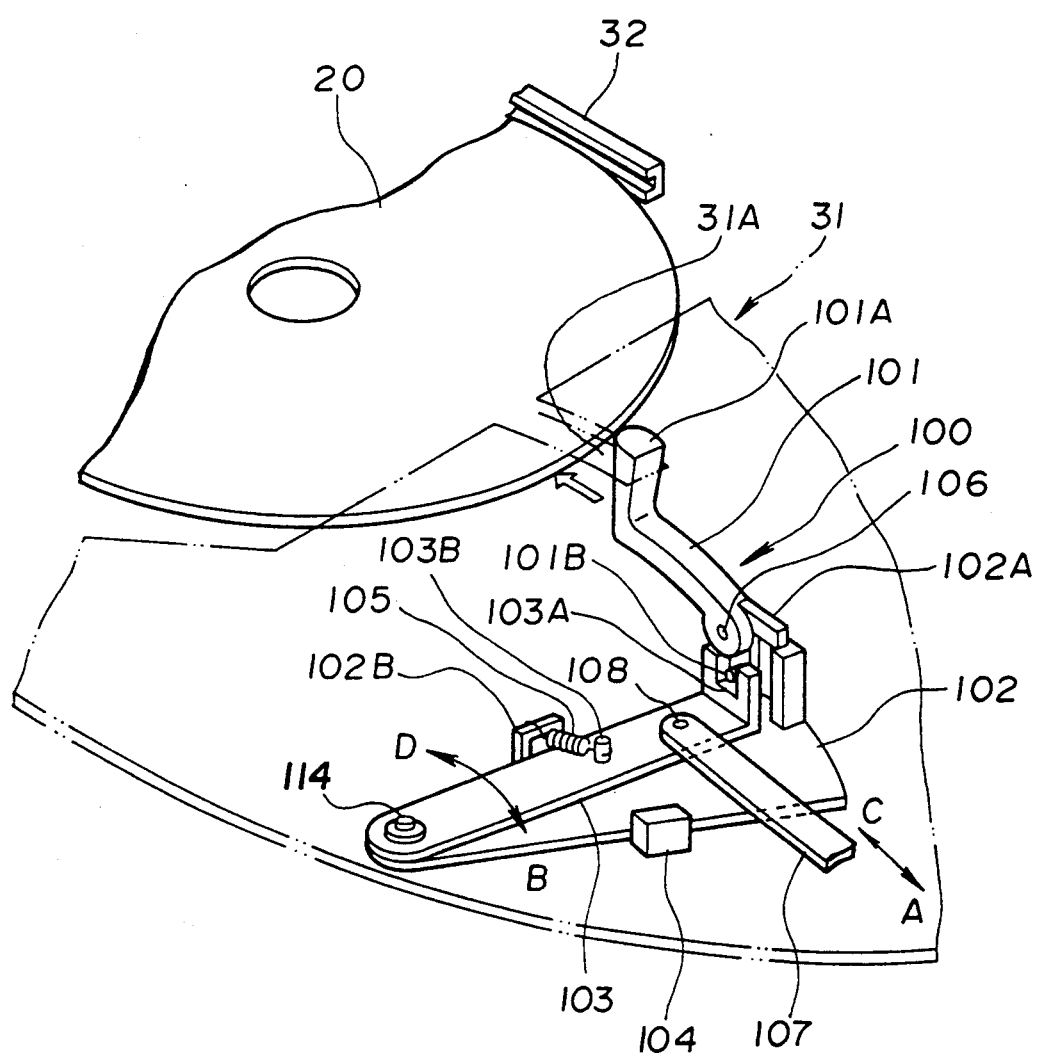
FIG. 13 is a fragmentary perspective view showing a disc return mechanism used in the disc loading apparatus of FIG. 1.

Referring to FIG. 13, each of the disc return mechanisms 100 includes first, second and third levers 101, 102 and 103. The second lever 102 is pivoted at 104 on the lower surface of the chassis 31. The second lever 102 is provided at its free end with a bearing portion 102A. The third lever 103 is also pivoted at 104 for sliding movement on the upper surface of the second lever 102. The third lever 103 is provided at its free end with a U-shaped hook 103A. A stopper 104 is formed on the chassis 31 for limiting rotation of the second lever 102 in the clockwise direction, as viewed in FIG. 13. The second lever 102 has a stopper 102B formed on its one side opposite to the other side facing to the stopper 104. A coil spring 105 is placed between the stopper 102B and a hook 103B formed on the upper surface of the third lever 103 to urge the third lever 103 into contact with the stopper 102B. The first lever 101 is provided at its one end with a head 101A for movement along a cutout 31A formed in the chassis 31 to push a disc 20. The other end of the first lever 101 is supported rotatably through a shaft 106 on the bearing portion 102A of the second lever 102. The bearing portion 102A has an operation pin 101B placed in engagement with the U- shaped hook 103A of the third lever 103. An operation rod 107 has its One end pivoted at 108 to the third lever.

When the operation rod 107 is pulled in the direction indicated by the arrow A from the position shown in FIG. 13, the third lever 103 rotates about the pivot 114 in the clockwise direction, as viewed in FIG. 13, against the resilient force of the coil spring 105. As a result, the U-shaped hook 103A pushes the operation pin 101B to rotate the first lever 101 about the shaft 106 so as to retract the head 101A below the chassis 31 from the path of delivery of the disc 20. In this case, the rotation of second lever 102 is limited by the stopper 104.

When the disc 20 passes over the head 101A retracted below the chassis 31, the operation rod 107 is moved in the direction indicated by the arrow C, the third lever 103 rotates about the pivot 114 in the direction indicated by the arrow D, causing the U-shaped hook 103A to rotate the first lever 101 about the shaft 106 in the direction extruding the head 101A through the cutout 31A above the chassis 31. When the operation rod 107 is moved further in the direction indicated by the arrow C, the third lever 103 pushes the stopper 102B to rotate the second lever 102 about the pivot 114 in the direction indicated by the arrow D together with the third lever 103. As a result, the first lever 101 moves in the direction causing the head 101A to push the peripheral surface of the disc 20 so as to discharge the disc 20 from the disc delivery path into the disc rack.

Thereafter, the operation rod 107 is moved in the direction indicated by the arrow A to rotate the third lever 103 in the direction indicated by the arrow B. As a result, the second lever 102 rotates in the direction indicated by the arrow B under the resilient force of the coil spring 105 to move the first lever 101 so as to bring its head 101A toward the edge of the cutout 31A. When the second lever 102 comes in engagement with the stopper 104, the head 101A comes near the edge of the cutout 31A. When the operation rod 107 is moved further in the direction indicated by the arrow A, the third lever 103 rotates about the pivot 114 in the direction indicated by the arrow B. As a result, the U-shaped hook 103A pushes the operation pin 101B to rotate the first lever 101 about the shaft 106 in a direction retracting the head 101A below the chassis 31 from the disc delivery pass.

The operation of the disc loading apparatus is as follows: When a disc loading signal is produced from a control circuit (not shown), the disc carrier 30 moves upward or downward to bring the disc delivery path into alignment with the disc rack specified by the disc loading signal. When the disc carrier 30 stops in position, the solenoid 68A is energized to retract the plunger 68B to rotate the rotary frame 53 about the shaft 55 against the resilient force of the coil spring 66 so as to bring the clutch member 50 into engagement with the drive wheel 51. This engagement is locked by the engagement of the lock plate 62 with the stopper 47. The electric motor 98 is connected to a power source (not shown) and it rotates in a forward direction when the engagement between the clutch member 50 and the drive wheel 51 is established. As a result, the forward drive is transmitted from the electric motor 98 to rotate the hock lever 41 in the forward direction and also to rotate the drive roller 34 in the forward direction.

The knock lever 41 rotates through the opening 17 into the disc rack. When the knock lever 41 rotates a predetermined angle, the disc 20 is pushed out of the disc rack into the disc delivery path defined by the disc guide 32 and the drive roller 34. The disc 20, which is held in friction contact with the rotating drive roller 34, advances the disc delivery path to a position intermediate between the ends of the disc delivery path while revolving around the drive roller 34 like a planetary gear.

The knock lever 41 rotates further at a predetermined angle to release the engagement between the lock plate 62 and the stopper 47 for free rotation of the rotary frame 53. As a result, the rotary frame 53 rotates toward its initial position under the resilient force of the coil spring 66 to move the clutch member 50 away from the drive wheel 51 so as to separate the drive from the electric motor 98 from the knock lever 41. Consequently, the knock lever 41 returns to its initial, equilibrium position under the resilient force of the toggle spring 69.

Then, the disc carrier 30 moves upward or downward to bring the disc delivery path in alignment with the disc drive. When the disc carrier 30 stops in position, the electric motor 98 is connected to the power source to rotate the drive roller 34. As a result, the disc 20 advances through the disc delivery path into the disc drive while revolving around the drive roller 34. In the disc drive, data are recorded on the disc 20 or the data recorded on the disc 20 is reproduced. Upon completion of the data recording or data reproduction for the disc 20, a disc unloading signal is produced from the control circuit.

In response to the disc unloading signal, the electric motor 98 is connected to the power source and it rotates in the reverse direction. The reverse drive is transmitted to rotate the drive roller 34 in the reverse direction. The disc 20 is then transferred from the disc drive into the disc drive path defined by the disc guide 32 and the drive roller 34. The disc 20, which is in friction contact with the rotating drive roller 34, advances the disc delivery path to the position intermediate between the ends of the disc delivery path while revolving around the drive roller 34. when the disc 20 arrives at the intermediate position, the drive motor 98 is disconnected from the power source and the disc carrier 30 moves upward or downward to bring the disc delivery path into alignment with the disc rack from which the disc 20 was taken. When the disc carrier 30 stops in position, the electric motor 98 is connected again to the power source and it rotates in the reverse direction. As a result, the reverse drive is transmitted from the electric motor 98 to rotate the drive roller 34 in the reverse direction. The disc 20, which is held in friction contact with the rotating drive roller 34, advances through the disc delivery path toward the disc rack while revolving around the drive roller 34.

When the disc 20 comes out of contact with the drive roller 34 in the way to the disc rack, the disc return mechanism 100 operates to rotate the first lever 101 in a direction extruding its head 101A through the cutout 31A above the chassis 31. Then, the disc return mechanism 100 moves the first lever 101 to push the disc 20 into the disc rack with the head 101A.

Figure 14:
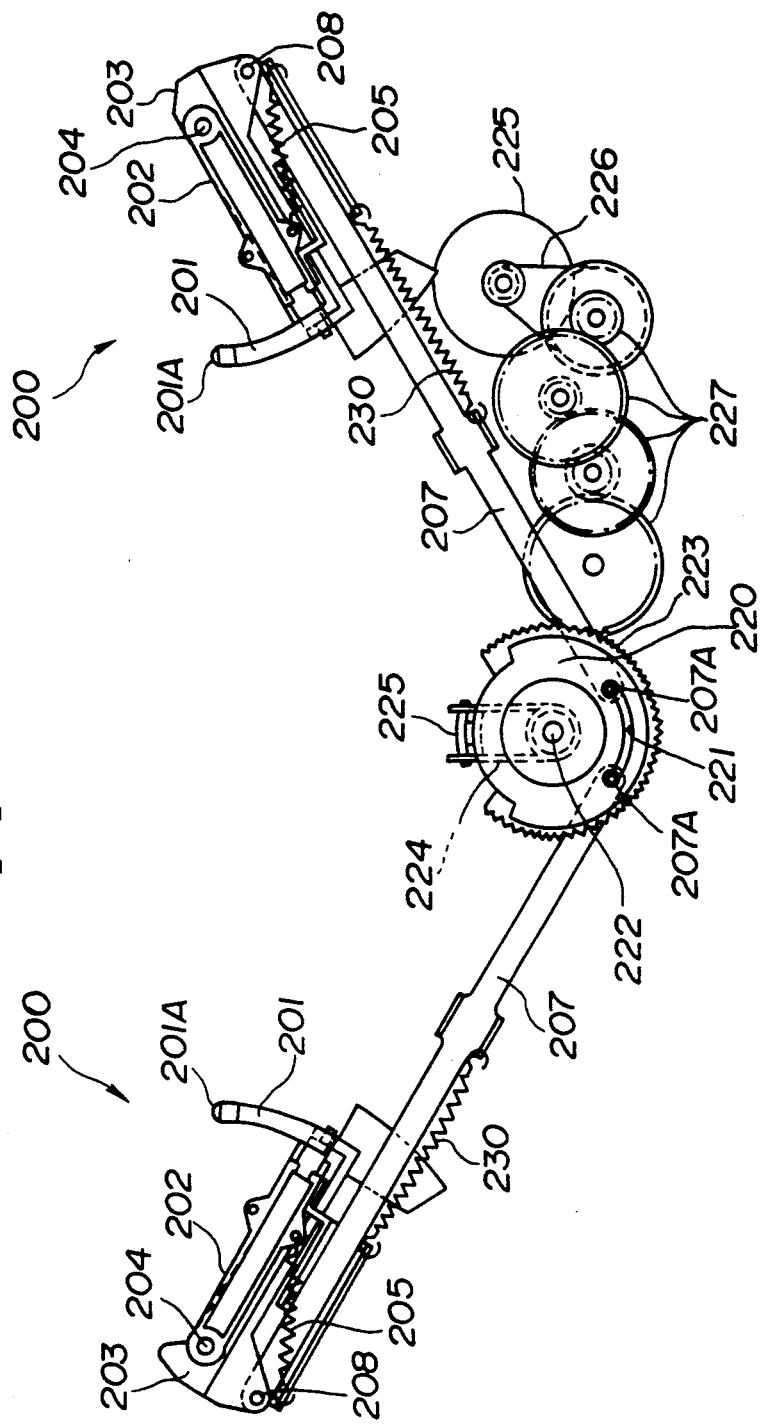
FIG. 14 is a plan view showing a modified form of the disc return mechanism used in the disc loading apparatus.

Referring to FIG. 14, there is shown a modified form of the disc return mechanisms used in the disc loading apparatus of the invention. In this embodiment, each of the disc return mechanisms 200 includes first, second and third levers 201, 202 and 203. The second lever 202 is pivoted at 204 on the lower surface of the chassis 31. The second lever 202 is provided at its free end with a bearing portion 202A. The third lever 203 is also pivoted at 204 for sliding movement on the upper surface of the second lever 202. The third lever 203 is provided at its free end with a U-shaped hook 203A. A stopper 204 is formed on the chassis 31 for limiting rotation of the second lever 202 in the clockwise direction, as viewed in FIG. 15. A spring hook member 210 is fixed on the chassis 31. A coil spring 205 is hooked at its one end on one end of the spring hook member 210 and at the other end thereof to a spring hook 203B formed on the third lever 203 to urge the third lever 203 into contact with the stopper 202B. The first lever 201 is provided at its one end with a head 201A for movement along a cutout 31A formed in the chassis 31 to push a disc 20. The other end of the first lever 201 is supported rotatably through a shaft 206 on the bearing portion 202A of the second lever 202. The bearing portion 202A has an operation pin 201B placed in engagement with the U-shaped hook 203A of the third lever 103. An operation rod 207 has its one end pivoted at 208 to the third lever 203. The operation rod 207 has a pin 207A secured at its free end thereof.

Figure 15:
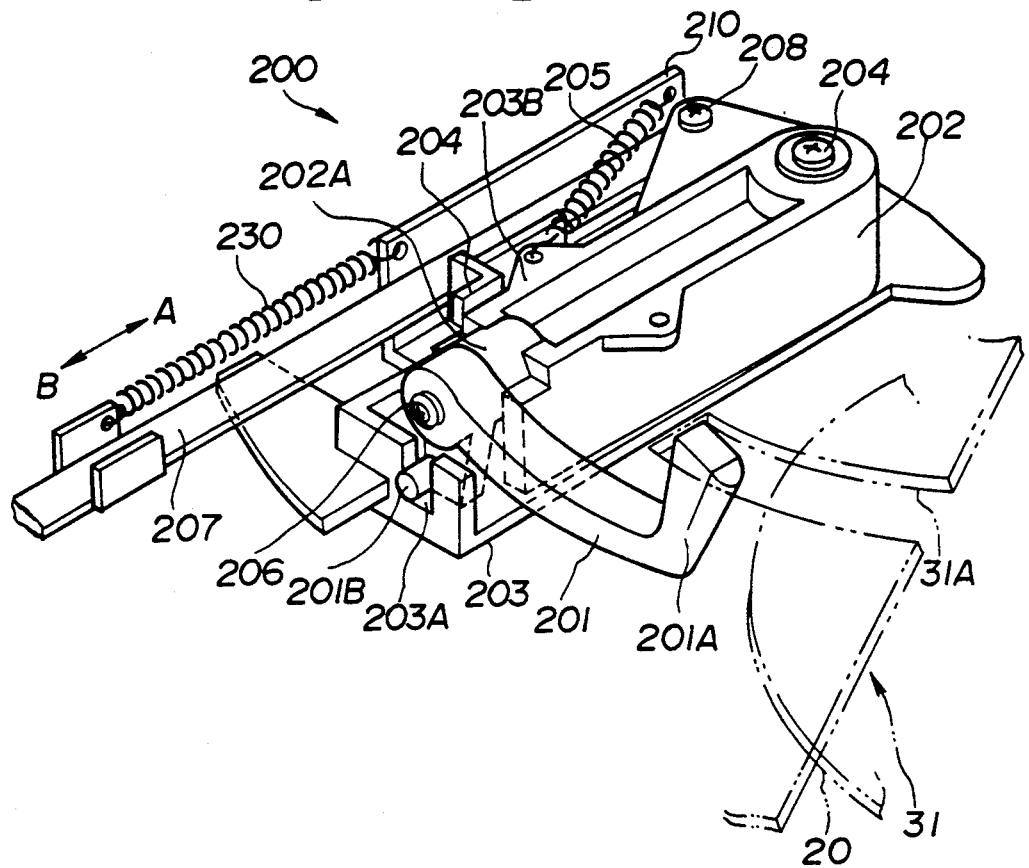
FIG. 15 is a fragmentary perspective view showing the disc return mechanism of FIG. 14.
Figure 16:
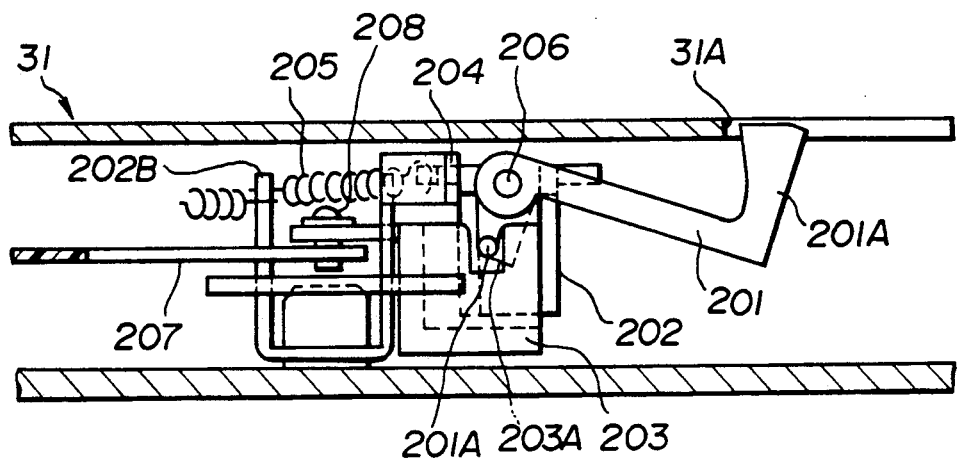
FIG. 16 is a side view of the disc return mechanism of FIG. 15.

The numeral 220 designates a cam disc-formed with an arc-shaped groove 221 in which the pin 207A is inserted or engaged. The cam disc 220 is secured rotatably on a shaft 222 having a cam gear 223 secured thereon for rotation in unison with the cam disc 220. A toggle spring 224 encircles the shaft 222 and holds the cam disc 220 in its equilibrium position. For this purpose, the toggle spring 224 has a coiled portion looped on the shaft 222 and parallel arm portions held in contact with the opposite side of a plate member 225 fixed on the chassis 31. The cam disc is driven by an electric motor 225. A drive from the electric motor 225 is transmitted through a timing belt 226 to a reduction gear train 227 and hence through the cam gear 223 to rotate the cam disc 220. A coil spring 230 is hooked at its one end to the other end of the spring hook member 210 and at the other end thereof to the operation rod 207 to urge the operation rod 207 in the direction indicated by the arrow A (FIG. 15). Thus, the coil spring 230 urges the cam disc 220 in the clockwise direction, as viewed in FIG. 14, for the left disc return mechanism 200 and in the counter-clockwise direction, as viewed in FIG. 14, for the right disc return mechanism 200.

The operation of the left disc return mechanism 200 is as follows: When the cam disc 220 is in its equilibrium position, the second lever 202 is held in pressure contact with the stopper 204 under the resilient force of the coil spring 205. The operation rod 207 is urged, by the resilient force of the coil spring 230, to rotate the third lever 203 in the clockwise direction, as viewed in FIG. 15. As a result, the U-shaped hook 203A pushes the operation pin 201B to rotate the first lever 201 about the shaft 206 so as to retract the head 201A below the chassis 31 from the path of delivery of the disc 20. In this case, the rotation of second lever 102 is limited by the stopper 204.

When the disc 20 passes over the head 101A retracted below the chassis 31, the electric motor 225 is connected to the power source. The drive from the electric motor 225 is transmitted through the timing belt 225 to the reduction gear train 227 and hence through the cam gear 223 to rotate the cam disc 220 in the counter-clockwise direction, as viewed in FIG. 14. As a result, the operation rod 207 is moved in the direction indicated by the arrow B (FIG. 15) to rotate the third lever 203 about the pivot 204 in the counter-clockwise direction, as viewed in FIG. 15, causing the U-shaped hook 203A to rotate the first lever 201 about the shaft 206 in the direction extruding the head 201A through the cutout 31A above the chassis 31. When the operation rod 207 is moved further in the direction indicated by the arrow B, the second lever 202 rotates in unison with the third lever 203 to move the first lever 201 in the direction causing the head 201A to push the peripheral surface of the disc 20 so as to discharge the disc 20 from the disc delivery path into the disc rack.

Thereafter, the electric motor 225 is disconnected from the power source to allow the cam disc 220 to rotate in the counter-clockwise direction, as viewed in FIG. 14, under the resilient force of the toggle spring 224. As a result, the operation rod 207 moves in the direction indicated by the arrow A to rotate the third lever 103 in the clockwise direction, as viewed in FIG. 15. Consequently, the second lever 102 rotates in the clockwise direction under the resilient force of the coil spring 205 to move the first lever 101 so as to bring its head 201A toward the edge of the cutout 31A. When the second lever 202 comes in engagement with the stopper 204, the head 201A comes near the edge of the cutout 31A. When the operation rod 207 is moved further in the direction indicated by the arrow A, the third lever 203 rotates about the pivot 204 in the clockwise direction, causing the U-shaped hook 203A to push the operation pin 201B so as to rotate the first lever 201 about the shaft 206 in a direction retracting the head 201A below the chassis 31 from the disc delivery pass.

When the electric motor 225 is driven in the reverse direction, the right disc return mechanism operates to push the disc from the disc delivery path into the disc rack in the same manner as described above in connection with the left disc return mechanism.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A disc loading apparatus for carrying disc between a disc container having a separate first and second container portions and a disc carrier, comprising:
   a drive roller mounted rotatably on the disc carrier, the drive roller having a peripheral surface for contact with the peripheral surface of a disc;
   a semicircular guide member secured on the disc carrier at a position concentric with the drive roller to define a disc carrying path along with the drive roller, the semicircular guide member having an inner peripheral surface facing to the peripheral surface of the drive roller for contact with the peripheral surface of a disc;
   a disc knocker mechanism rotatably in a forward direction and in a reverse direction according to a drive supplied by an electric motor, said disc knocker mechanism being provided on the disc carrier between said first and second container portions for knocking the peripheral surface of a disc to push a disc out of the first container portion when the disc knocker mechanism is rotated in the forward direction and out of the second container portion when the disc knocker mechanism is rotated in the reverse direction, and into the disc carrying path; and drive means for rotating the drive roller to advance a disc in the disc carrying path with the advancing disc revolving around the drive roller.

2. The disc loading apparatus as claimed in claim 1, wherein the drive roller is formed in the peripheral surface thereof with an annular groove for engagement with the peripheral surface of a disc, and wherein the semicircular guide member is formed in the inner peripheral surface thereof with a semicircular groove for engagement with the peripheral surface of a disc.

3. The disc loading apparatus as claimed in claim 2, wherein the annular groove has a bottom provided with a friction member for engagement with the peripheral surface of a disc.

4. The disc loading apparatus as claimed in claim 1, wherein the disc knocker mechanism further includes a knock lever secured rotatably on the disc carrier for knocking the peripheral surface of a disc, a clutch movable between first and second positions, the clutch transmitting a drive from the electric motor to rotate the knock lever from an equilibrium position in the forward or reverse direction thereby pushing a disc when the clutch is at the first position, the clutch interrupting the drive to the knock lever at the second position, means for providing a resilient force to return the knock lever to the equilibrium position.

5. The disc loading apparatus as claimed in claim 4, wherein the disc knocker mechanism includes means for retaining the clutch at the first position until the knock lever rotates at a first predetermined angle.

6. The disc loading apparatus as claimed in claim 5, wherein the disc knocker mechanism includes means for moving the clutch from the first position to the second position when the knock lever rotates at a second predetermined angle greater than the first predetermined angle.

7. The disc loading apparatus as claimed in claim 1, further comprising a disc pushing mechanism for pushing a disc from the disc carrying path into the first container portion or the second container portion.

8. The disc loading apparatus as claimed in claim 7, wherein the disc pushing mechanism includes a first lever having a head for pushing a disc, a second lever secured on the disc carrier for rotatably supporting the first lever between first and second positions, the first lever retracting from the disc carrying path at the first position, the first lever extruding into the disc carrying path at the second position, a third lever secured on the disc carrier for moving the first lever from the first position to the second position when the third lever rotates at a predetermined angle with respect to the second lever, the third lever rotating the second lever to cause the first lever to push a disc with the head when the third lever rotates further.

9. A disc loading apparatus including a disc container with separate first and second portions each having a plurality of discs placed in a pile therein, a disc drive for recording and/or reproducing data for a disc, and a disc carrier for carrying a desired one of the discs from the first and second disc container portions to the disc drive, the disc carrier comprising:
an electric motor;
a wheel rotatable in a forward direction and in a reverse direction according to a drive supplied by the electric motor;
a disc knocker mechanism secured rotatably on the disc carrier, said disc knocker mechanism including a knock lever movable according to a force supplied from the rotation of the wheel for pushing a desired one of the discs out of the first container portion when the wheel is rotated in the forward direction and out of the second container portion when the wheel is rotated in the reverse direction;
a clutch movable between first and second positions, the clutch transmitting the drive from the electric motor to rotate the wheel at the first position, the clutch interrupting the drive to the wheel at the second position; and
release means provided on the knock lever for moving the clutch to the second position after the desired disc is pushed out of the disc container.

10. The disc loading apparatus as claimed in claim 9, wherein the disc carrier further comprises a lever return spring for returning the knock lever to an equilibrium position when the clutch is moved to the second position.

11. The disc loading apparatus as claimed in claim 9, wherein the disc carrier further comprises a disc pushing mechanism for pushing the desired disc from the disc carrier into the disc container.

12. The disc loading apparatus as claimed in claim 11, wherein the disc pushing mechanism includes a first lever having ahead for pushing the desired disc, a second lever secured on the disc carrier for rotatably supporting the first lever between first and second position, the first lever retracting below the disc carrier at the first position, the first lever extruding above the disc carrier at the second position, a third lever secured on the disc carrier for moving the first lever from the first position to the second position when the third lever rotates at a predetermined angle with respect to the second lever, the third lever rotating the second lever to cause the first lever to push the desired disc with the head when the third lever rotates further.

13. A disc loading apparatus for carrying a disc between a disc container and a disc carrier, comprising:
a drive roller mounted rotatably on the disc carrier, the drive roller having a peripheral surface for contact with the peripheral surface of a disc;
a semicircular guide member secured on the disc carrier at a position concentric with the drive roller to define a disc carrying path along with the drive roller, the semicircular guide member having an inner peripheral surface facing to the peripheral surface of the drive roller for contact with the peripheral surface of a disc;
a disc knocker mechanism provided on the disc carrier for knocking the peripheral surface of the disc to push the disc out of the disc container into the disc carrying path; and
drive means for rotating the drive roller to advance the disc in the disc carrying path with the disc revolving around the drive roller;
wherein the drive roller is secured rotatably through a first shaft on a first rotary member, the first rotary member being secured rotatably through a second shaft on a second rotary member, the second rotary member being secured rotatably through a third shaft on the disc carrier, first resilient means for providing a resilient force to retain the drive roller at an equilibrium position, and second resilient means for providing a resilient force to rotate the second rotary member in a direction causing the drive roller to push the disc against the guide member.

14. The disc loading apparatus as claimed in claim 13, wherein the first resilient means includes a toggle spring encircling the second shaft and having two arms held in contact with the opposite sides of a projection formed on the first rotary member and also with the opposite sides of a projection formed on the second rotary member.

15. The disc loading apparatus as claimed in claim 13, wherein the second resilient member includes a coil spring placed between the second rotary member and the disc carrier.

16. The disc loading apparatus as claimed in claim 13, wherein the drive means includes an electric motor having an output shaft, a first gear secured on the output shaft of the electric motor, the first gear being in mesh engagement with a second gear secured on the third shaft having a third gear secured thereon, the third gear being in mesh engagement with a fourth gear secured on a fourth shaft secured on the second rotary member, the second rotary member having a fifth gear secured thereon, the fifth gear being in mesh engagement with a sixth gear secured on the second shaft, the sixth gear being in mesh engagement with a seventh gear on the first shaft for rotation in unison with the drive roller.

* * * * *